United States Patent
Sochard

[11] 3,745,517
[45] July 10, 1973

[54] DISTANCE MEASURING DEVICE AND METHOD
[75] Inventor: Irving I. Sochard, Chevy Chase, Md.
[73] Assignee: The United States of America as represented by the Secretary of the Navy, Washington, D.C.
[22] Filed: May 11, 1970
[21] Appl. No.: 48,759

[52] U.S. Cl. ............................................. 340/1 R
[51] Int. Cl. ............................................. G01s 9/68
[58] Field of Search .................... 340/1 R, 3 R, 3 F

[56] References Cited
UNITED STATES PATENTS
| | | | |
|---|---|---|---|
| 3,094,681 | 6/1963 | Kietz et al. | 340/3 F |
| 3,458,854 | 7/1969 | Murphree | 340/3 R |
| 2,985,018 | 5/1961 | Williams | 340/1 R X |
| 3,419,235 | 12/1968 | Wood, Jr. | 340/1 R X |

*Primary Examiner*—Richard A. Farley
*Attorney*—R. S. Sciascia and J. A. Cooke

[57] ABSTRACT

A distance measuring device utilizing a source of acoustic signals of at least a predetermined wavelength which is transmitted to a reference surface and the reflected acoustic signal is received in a detector. The transmitted and received signals are phase-mixed in a mixer to provide a signal responsive to the distance between the distance measuring device and the reflecting surface irrespective of the presence of a non-rigid intervening media, such as foliage, which obstructs the desired reflecting surface. An envelope detector and a threshold device provide a utilization signal when the distance between the distance measuring device and the reflecting surface reaches a predetermined value.

5 Claims, 2 Drawing Figures

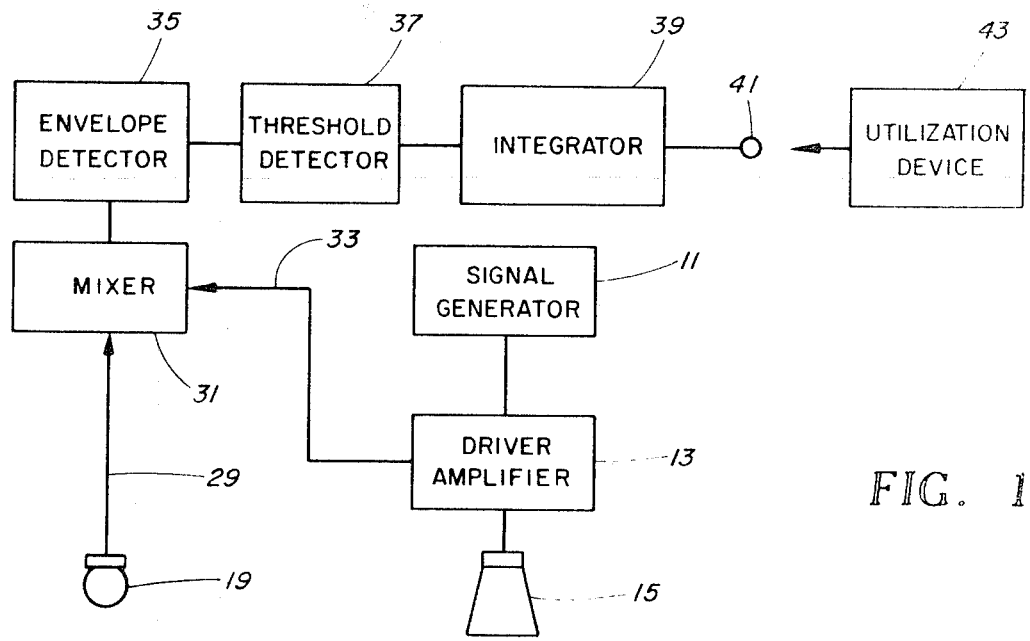
FIG. 1
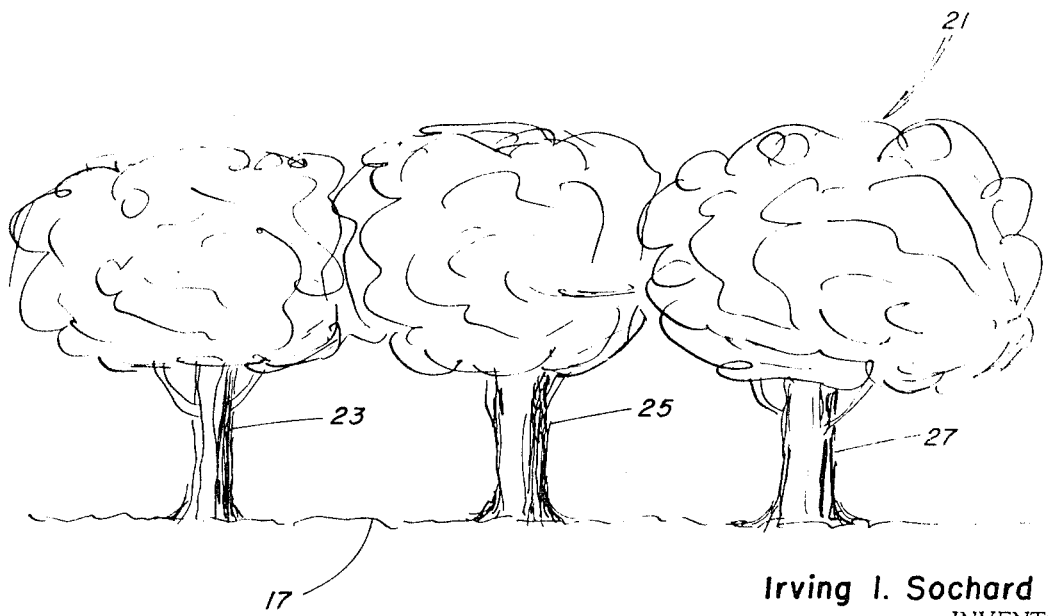
Irving I. Sochard
INVENTOR

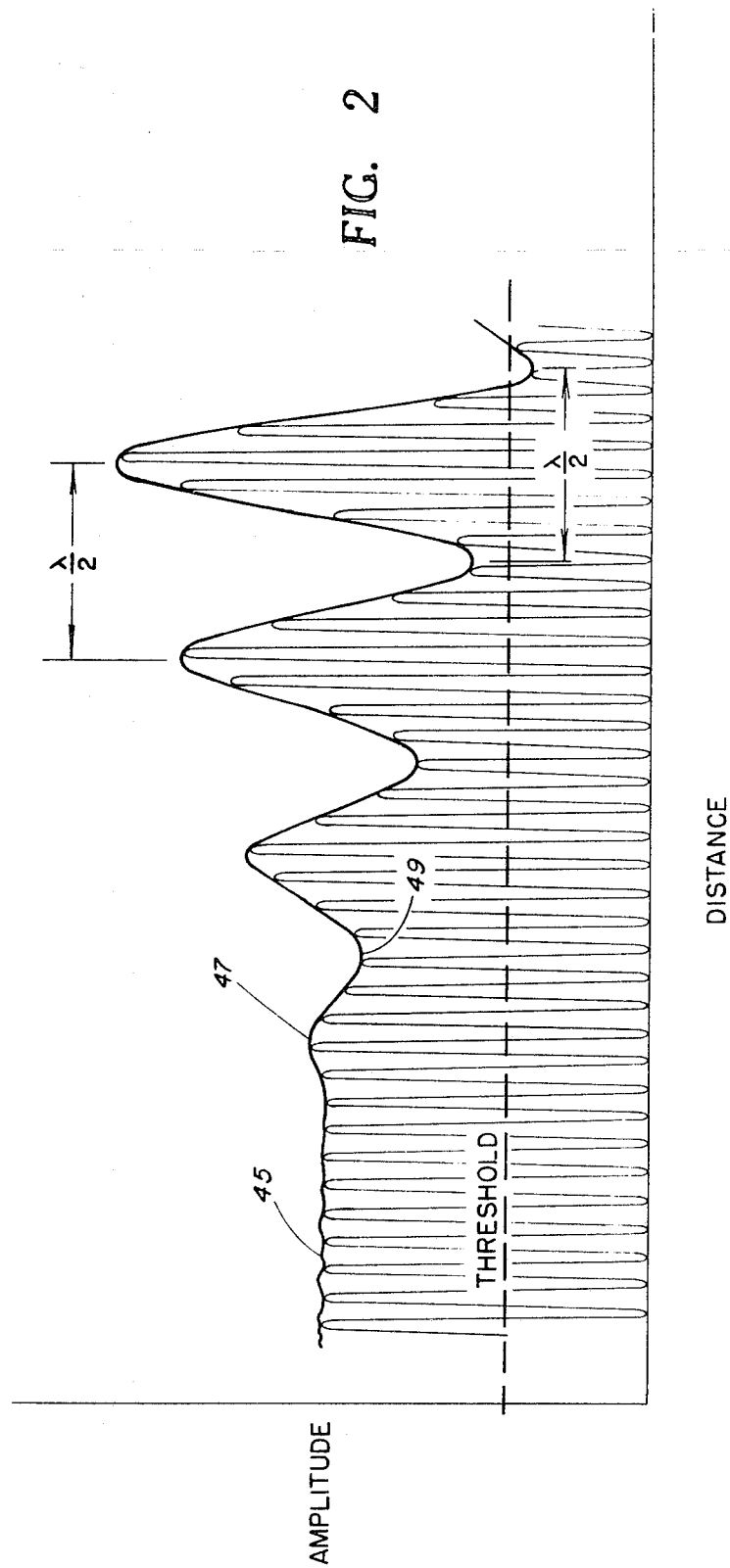

DISTANCE MEASURING DEVICE AND METHOD

BACKGROUND OF THE INVENTION

This invention relates generally to distance measuring devices and more particularly to an acoustic measuring device insensitive to a non-rigid intervening media, such as foliage, or the like.

Prior art distance measuring devices have been devised which transmit a signal to a reflecting reference surface and analyze the time difference between the transmitted signal and a received echo to give an indication of distance between the distance measuring device and the reflecting reference surface. These prior art distance measuring devices have worked relatively satisfactorily where the reflecting reference surface is a rigid, hard surface, such as ground or the like, but have been somewhat unsatisfactory where the reflecting surface is not the desired plane of reference. Thus, for example, where ground level is the desired plane of reference, that is, the surface to which it is desired to determine the distance, but is covered by a non-rigid intervening media, such as a foliage canopy, or the like, the transmitted signal will be reflected by the foliage canopy rather than the ground surface thereby yielding an inaccurate indication of distance.

In the case of an altimeter, methods have been devised which attempt to accurately measure the distance from the altimeter to ground level accurately despite the presence of a non-rigid intervening media, such as foliage. These methods are based on complex atmospheric pressure measurements which require both a knowledge of the altitude of the ground at the distance to be measured and a knowledge of the barametric pressure at a known nearby altitude at the time of measurement. These methods have been less than satisfactory since the altitude of ground at the distance to be measured is not always readily ascertainable. Furthermore, the day to day changes in atmospheric pressure, unless corrected for, can result in errors of more than a hundred feet, plus or minus, in the distance measurement between ground and the altimeter.

SUMMARY OF THE INVENTION

Accordingly, one object of the invention is to provide an acoustic distance measuring device.

Another object of the present invention is to provide a distance measuring device capable of providing an accurate measurement of distance to a desired reflecting surface in spite of the presence of a non-rigid intervening media.

A still further object of the instant invention is to provide a distance measuring device that is utilizable in an ordnance device, such as a bomb or a tank or the like, to accurately ascertain the distance between the ordnance device and a target.

Yet another object of the present invention is to provide a method for accurately ascertaining the distance between two objects despite the presence of a non-rigid intervening media.

Briefly, these and other objects of the present invention are attained by providing a distance measuring device and method therefor which utilizes an acoustic signal, of sufficiently large wave length compared to the dimensions of a non-rigid intervening media, to provide a true indication of the distance from the distance measuring device to a target or the like despite the presence of the non-rigid media intermediate the distance measuring device and a target.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein:

FIG. 1 is a block diagrammatic view of the acoustic distance measuring device according to the present invention, and FIG. 2 is a graphical view of one of the operational signals of the acoustic distance measuring device of FIG. 1.

DESCRIPTION OF THE PREFERRED EMBODIMENT

Referring now to the drawings and more particularly to FIG. 1 thereof, the acoustic distance measuring device according to one embodiment of the present invention is shown as utilized in an ordnance device, such as a bomb, or the like, approaching a target and includes a conventional signal generator 11 adapted to provide an electrical signal input, such as a continuous wave sinusoidal signal of constant amplitude, to a driver amplifier 13 connected thereto. Of course, it is readily apparent, that while the instant invention is shown as utilized in a falling ordnance device and is responsive to the varying distance between the device and a target, the invention is applicable elsewhere. Thus, for example, the instant invention may be utilized in an altimeter to ascertain the relatively constant distance between the altimeter and a reflecting surface if the signal generator 11 is adapted to provide a swept frequency signal input to driver amplifier 13. Similarly, the instant invention may be utilized to ascertain the horizontal distance between an ordnance device, such as a tank or the like, and a target such as a pill box or the like, despite the presence of a non-rigid intervening media.

After amplification of the electrical signal in driver amplifier 13, the electrical signal is transformed into an acoustic signal by a conventional electro-acoustic transducer, such as, for example, a loud-speaker 15 coupled to the driver amplifier. As hereinafter more fully explained, the acoustic signal provided by loud-speaker 15 is transmitted to a plane of reflecting reference, such as ground 17, wherein a portion of the transmitted acoustic signal is reflected and intercepted by an acoustic receiver, such as a microphone 19.

As hereinbefore explained, prior art distance measuring devices have been unsatisfactory if the desired reflecting reference surface, such as ground 17, was covered by a non-rigid intervening media, such as a foliage canopy 21 provided by trees 23, 25 and 27. By utilizing an acoustic signal of sufficiently large wavelengths, however, the acoustic signal can penetrate the non-rigid intervening media and provide a signal at microphone 19 which is reflected off ground 17 rather than reflected off the foliage canopy.

More particularly, it has been found that if the wavelength, $\lambda$, of the transmitted acoustic signal is significantly longer than the dimensions of the non-rigid intervening media, the acoustic signal will not be affected by the intervening media. Thus, it has been found that where the non-rigid intervening media is foliage or the like, λ should be at least approximately five or six times larger than the diameter of the branches. Thus, foliage on branches less than about 6 inches in diameter will not affect the transmitted and received acoustic signals while foliage on branches about one foot or less in diameter will affect the transmitted and received signal only slightly if the wavelength of the transmitted acoustic signal is approximately 4 feet. Applying the well known theory that the frequency times the wavelength equals the velocity of sound in ambient conditions, which is 1,080 feet per second, one obtains a frequency of 270 Hz for a 4 foot wavelength. Thus, the echo signal received by microphone 19 will be insensitive to the presence of a non-rigid intervening media, such as foliage 21 or the like, but will be reflected off ground 17 to give a correct indication of distance from ground 17 to the ordnance device.

The reflected signal received in microphone 19 provides an electrical signal at a lead 29 responsive to the reflected acoustic signal. If the ordnance device is a retarded bomb or the like, the effect of doppler shift may be neglected since the velocity of the falling bomb is small compared to the speed of sound. The microphone output at lead 29 is phase-mixed, in a conventional phase-mixer 31 connected thereto, with an electrical signal at a lead 33 responsive to the transmitted acoustic signal. If desired, a delay network (not shown) may be inserted between the driver amplifier and mixer 31 to compensate for the time delay between the transmitted and received signal. Furthermore, a frequency shifter also may be inserted between the driver amplifier and mixer to compensate for doppler shifts in the case where the velocity of the ordnance device is relatively large.

The output from mixer 31 is an electrical signal indicative of the distance between the ordnance device and ground level 17. The signal may be envelope detected and threshold detected in an envelope detector and a threshold detector 35 and 37, respectively, and integrated in an integrator 39 to provide an output signal. The output signal at terminal 41 is responsive to the detection of a predetermined range or distance between the ordnance device and ground. As hereinafter more fully explained, envelope detector 35 is desirable since the output of mixer 31 is an electrical signal which depends on the constructive and destructive interference of the transmitted and received acoustic signals. Terminal 41 is connectable to a utilization device 43, such as a firing circuit or the like, or any desired circuitry responsive to the predetermined distance as determined by threshold detector 37.

The operation of the acoustic distance measuring device may be best understood with reference to FIG. 1 of the drawing in conjunction with FIG. 2 which shows the amplitude of the electrical signal at the output of mixer 31 as a function of the distance between the ordnance device and ground. As the ordnance device moves towards ground 17, with a predetermined velocity less than the velocity of sound, an acoustic signal of a wavelength λ, of approximately 4 feet corresponding to frequencies of 250 hertz or less, is transmitted via loud-speaker 15 to ground. As hereinbefore explained, the transmitted acoustic signal is unaffected by the non-rigid intervening media, such as foliage canopy 21, and is, therefore, reflected off ground 17 and received by microphone 19. The electrical signals at leads 29 and 33 responsive, respectively, to the reflected and transmitted acoustic signals, are phase-mixed in a mixer 31 to yield an electrical signal whose overall amplitude varies as the ordnance device approaches ground due to the constructive and destructive interference between the transmitted and reflected acoustic signals.

More particularly, referring to FIG. 2, it is apparent that at a relatively large distance between the ordnance device and ground, the output from envelope detector 35 is relatively constant, as indicated at 45, since very little of the reflected acoustic signal is detected by microphone 19 and the output from mixer 31 is due almost entirely to the transmitted acoustic signal represented by the electrical input to the mixer at lead 33. As the ordnance device approaches ground 17, a portion of the reflected signal is detected by microphone 19 and, depending on the distance between ground and ordnance device, the envelope of the output signal from mixer 31 may be at a peak 47 due to constructive interference between the transmitted and received acoustic signals. Similarly, as the approaching distance decreases still further, trough 49 will be detected by the envelope detector 35 due to destructive interference between the transmitted and the received acoustic signal which is sensed in mixer 31. It is readily apparent that the constructive interference peaks and the destructive interference troughs occur, respectively, at multiples of λ/2 as the ordnance device approaches ground 17. However, since the magnitude of the reflected signal received by microphone 19 increases as the ordnance device approaches the ground, the respective peaks and troughs of the mixer output signal which are enveloped detected also increase. Threshold detector 37 may be utilized to provide a signal at terminal 41 responsive to the occurrence of a peak or trough above or below, respectively, a predetermined value indicative, therefore, of a predetermined distance between the ordnance device and the approaching ground surface. Integrator 39 may be included to prevent the occurrence of spurious signals or the like some providing a false indication of the desired distance. Similarly, it has been found that for purposes of immunity from noise or other spurious signals, it is advantageous to detect the troughs of the envelope signal rather than the peaks.

It is readily apparent, therefore, that the present invention provides both an apparatus and a method for measuring the distance between a desired reflecting surface and an ordnance device or the like which is insensitive to a non-rigid intervening media.

Obviously, numerous modifications and variations of the present invention are possible in the light of the above teachings. Thus, an array of acoustic receivers, such as a plurality of microphones, may be utilized to provide a plurality of outputs which may be processed in such a manner as to eliminate or minimize the effects of various ambient sounds such as wind, nearby explosions, the snapping of branches, or the like. Furthermore, while the hereinbefore described distance measuring device utilizes an electrical acoustic source, it is readily apparent that mechanical acoustic sources, such as a siren or whistle or the like, may be utilized and that the acoustic signal may be directly mixed to obtain the beat frequencies indicative of distance to ground. Additionally, while the distance measuring device of the described embodiment utilizes a continuous wave signal, the device may also utilize pulse type acoustic signals or the like. It is therefore to be understood that within the scope of the appended claims, the invention may be practiced otherwise than as specifically described herein.

What is claimed as new and desired to be secured by Letters Patent of the United States is:

I claim:

1. A distance measuring device insensitive to the presence of a non-rigid intervening media comprising
   means for providing an acoustic signal of sufficiently long wavelengths to be insensitive to the presence of said non-rigid intervening media, wherein said non-intervening media is foilage
   means for transmitting said acoustic signal to an object the distance from which is to be measured,
   means for receiving an acoustic signal responsive to the reflection of said transmitted acoustic signal off said object despite the presence of said non-rigid intervening media, and
   means for mixing said transmitted acoustic signal and said received acoustic signal, said mixed signal indicative of the distance to said object irrespective of the presence of said non-rigid intervening media.

2. A distance measuring device according to claim 1 further comprising
   threshold means for detecting the presence of said mixed signal at a predetermined level indicative of a predetermined distance to said object.

3. A distance measuring device according to claim 1 wherein
   said mixed signal varies with the distance and is responsive to the interference between said transmitted and said received signals.

4. A distance measuring device according to claim 1 wherein
   said long wavelength is approximately 4 feet and the frequency of said transmitted acoustic signal is approximately 270 Hz.

5. A distance measuring device according to claim 2 further including
   an envelope detector coupled between said mixing means and said threshold means; and
   integrating means coupled to the output of said threshold means.

* * * * *